United States Patent [19]
Tanaka et al.

[11] Patent Number: 6,070,689
[45] Date of Patent: *Jun. 6, 2000

[54] MID-ENGINE VEHICLE WITH ENGINE AND DRIVER'S SEAT LOCATED LATERALLY ON EITHER SIDE OF A LONGITUDINAL AXIS OF THE VEHICLE

[75] Inventors: Hiromasa Tanaka; Noboru Ohta; Hideto Sakane; Yuichi Yamazaki; Masaki Kobayashi; Yasuyoshi Tanaka, all of Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,489

[22] Filed: Oct. 9, 1996

[30] Foreign Application Priority Data

Oct. 13, 1995 [JP] Japan .................................... 7-265246

[51] Int. Cl.[7] ...................................................... B60K 1/00
[52] U.S. Cl. ............................................ 180/291; 180/292
[58] Field of Search .................................... 180/233, 248, 180/291, 292, 908

[56] References Cited

U.S. PATENT DOCUMENTS

| | | | |
|---|---|---|---|
| 1,903,968 | 4/1933 | Hosmer | 180/908 |
| 2,625,285 | 1/1953 | Weaver | 180/908 |
| 4,805,720 | 2/1989 | Clenet | 180/248 |
| 5,131,357 | 7/1992 | Inoue et al. | 180/312 |
| 5,143,167 | 9/1992 | Moriyama et al. | 180/297 |
| 5,199,526 | 4/1993 | Derviller | 180/297 |

FOREIGN PATENT DOCUMENTS 5-85195  4/1993  Japan ..................................... 180/908

*Primary Examiner*—Brian L. Johnson
*Assistant Examiner*—Faye M. Fleming
*Attorney, Agent, or Firm*—Armstrong, Westerman, Hattori, McLeland & Naughton

[57] ABSTRACT

A driver's seat and an engine are disposed side-by-side to maximize the advantages of a mid-engine vehicle layout. A driver's seat is offset leftwards with respect to a center line of a vehicle body in a one-seater vehicle, and a power unit integrally provided with the engine and transmission is disposed on the right of the center line of the vehicle body. When viewed from the side of the vehicle, the seat and the power unit overlap each other. Thus, the inertial moment about a yaw axis of the vehicle is minimized to enhance the turning performance and moreover, the distribution of load to front wheels Wf and rear wheels Wr is made uniform to enhance the performance of the vehicle when in motion.

8 Claims, 4 Drawing Sheets

MID-ENGINE VEHICLE WITH ENGINE AND DRIVER'S SEAT LOCATED LATERALLY ON EITHER SIDE OF A LONGITUDINAL AXIS OF THE VEHICLE

BACKGROUND OF THE INVENTION

1. Field of the Invention

The present invention relates to a mid-engine vehicle including an engine mounted between front and rear axles.

2. Description of the Related Art

A so-called mid-engine vehicle in which a center of gravity of a power unit including an engine is disposed between axles of front and rear wheels has an improved turning performance, and the distribution of load to the front and rear wheels is made uniform to provide a well-balanced performance when the vehicle is in motion, because of a small inertial force about a yaw axis, as compared with either a front engine vehicle in which a gravity center of a power unit is disposed forward of the axles of the front wheels, or a rear engine vehicle in which a center of gravity of the power unit is disposed in back of the axles of the rear wheels.

In general, a compartment for a driver and passengers is provided at a longitudinally central portion of a vehicle and for this reason, it is difficult to dispose a power unit at such a position. Therefore, a power unit in a conventional mid-engine vehicle is disposed in the rear of the compartment and immediately in front of the rear wheel axles.

However, if the above-described layout is employed, the inertial moment about the yaw axis is not significantly decreased and moreover, the distribution of load to the front and rear wheels is biased toward the rear wheels. For this reason, the above-described advantage of the mid-engine vehicle is not sufficiently realized.

SUMMARY OF THE INVENTION

An object of the present invention is to maximize the advantage of the mid-engine layout by laterally disposing the driver's seat and the engine side-by-side.

To achieve the above object, there is provided a mid-engine vehicle in which a driver's seat and an engine are disposed between an axle of left and right front wheels and an axle of left and right rear wheels, the driver's seat being disposed laterally on one side of a center line of a vehicle body and the engine being disposed laterally on the other side of the center line, the driver's seat and the engine being superposed on each other as viewed sideways.

The engine may be a V-type two-cylinder engine having a crankshaft whose axis is disposed laterally, and a clutch may be laterally disposed at an outer end of the crankshaft.

Preferably, a transmission is disposed behind the engine, where the transmission has an input shaft and an output shaft which are disposed laterally, and an output is taken up from a laterally inner end of the output shaft.

A sequential shift lever is disposed between the driver's seat and the engine for shifting the transmission by a longitudinal movement of the lever.

As an alternative, the engine may be an in-line multi-cylinder engine having a crankshaft whose axis is disposed longitudinally.

DETAILED DESCRIPTION OF THE PREFERRED EMBODIMENTS

The present invention will now be described by way of embodiments shown in the accompanying drawings.

Figure 1:
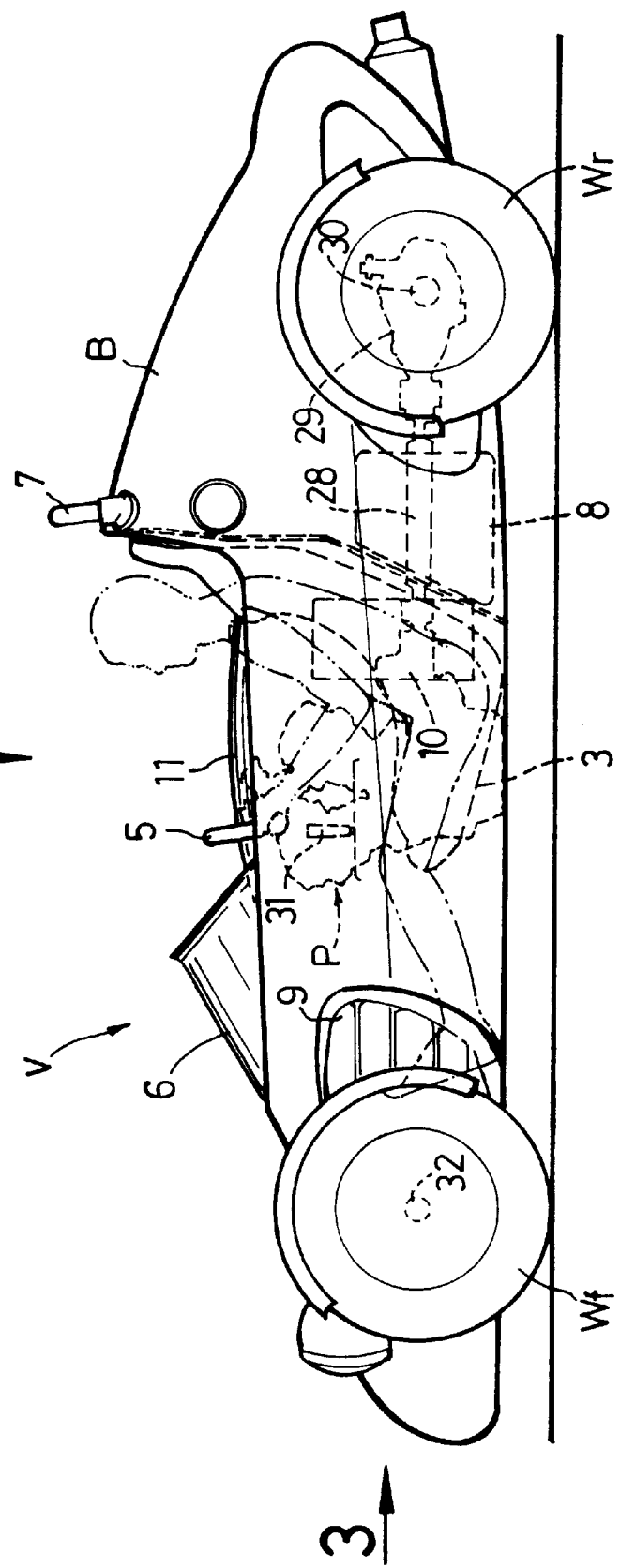
FIG. 1 is a side view of the entire mid-engine vehicle.
Figure 2:
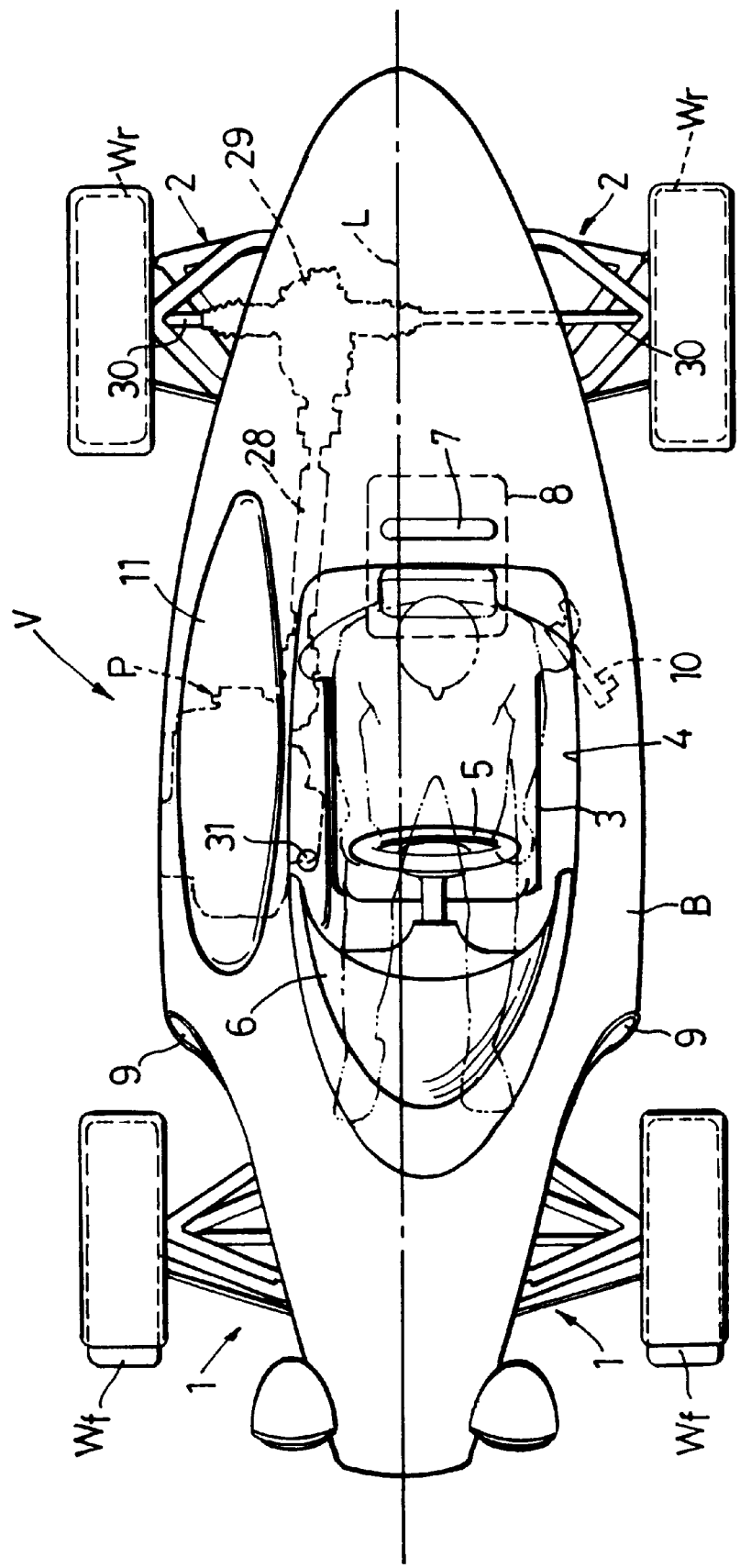
FIG. 2 is a view taken along an arrow 2 in FIG. 1.
Figure 3:
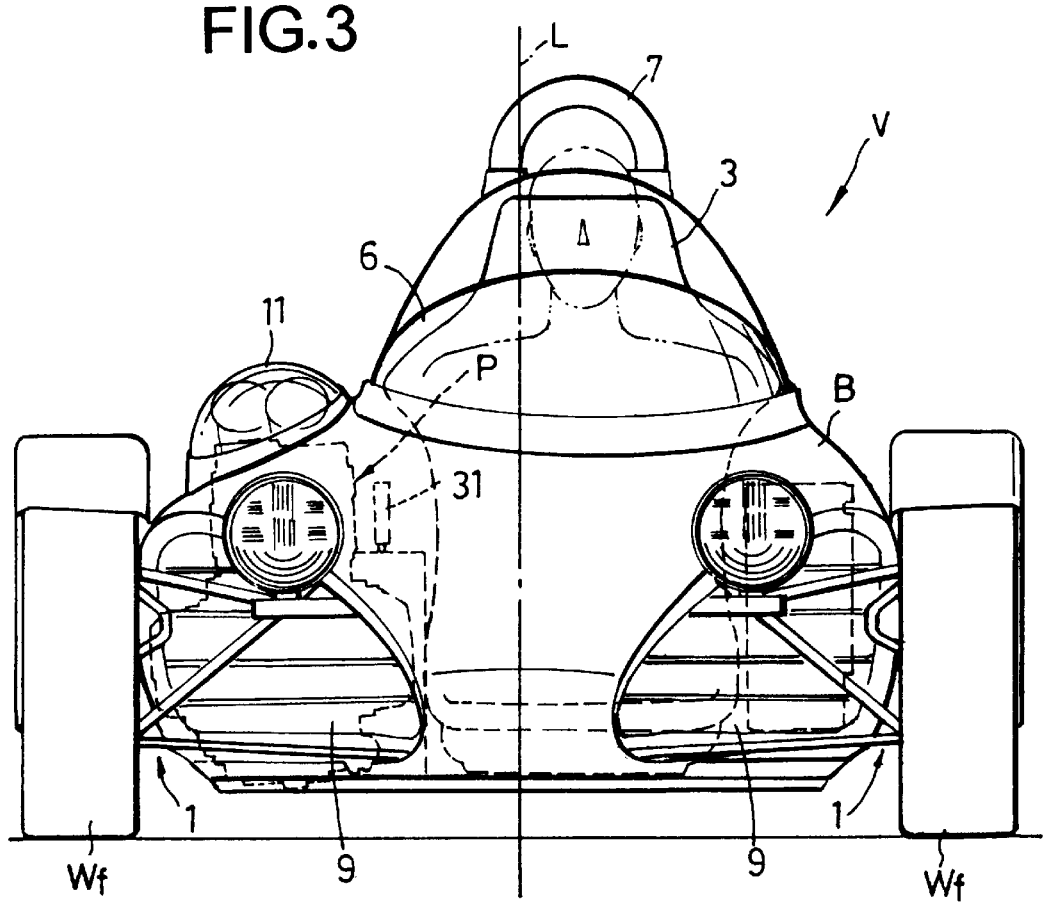
FIG. 3 is a view taken along an arrow 3 in FIG. 1.
Figure 4:
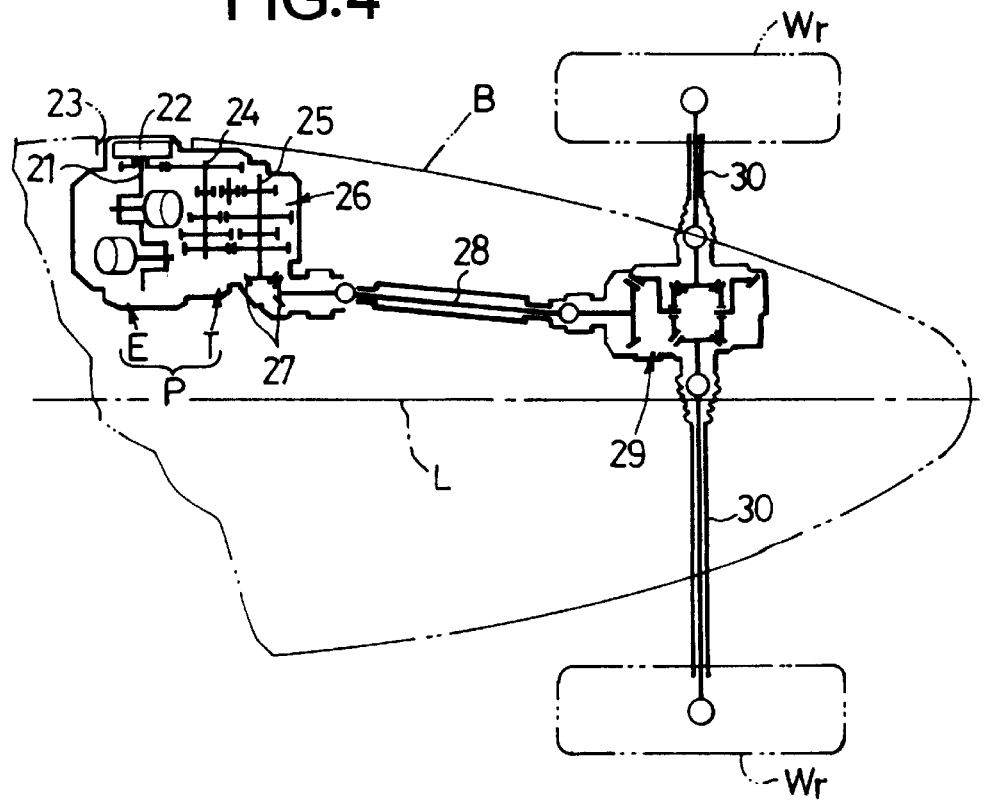
FIG. 4 is an enlarged view of an essential portion in FIG. 2.

FIGS. 1 to 4 illustrate a first embodiment of the present invention, wherein FIG. I is a side view of the entire mid-engine vehicle; FIG. 2 is a view taken along an arrow 2 in FIG. 1; FIG. 3 is a view taken along an arrow 3 in FIG. 1; and FIG. 4 is an enlarged view of an essential portion in FIG. 2.

As shown in FIGS. 1 to 3, a one-seater mid-engine vehicle V includes left and right front wheels Wf, Wf which are follower wheels suspended by double-wishbone type suspensions 1, 1, and left and right rear wheels Wr, Wr which are driven wheels suspended by double-wishbone type suspensions 2, 2. A seat 3 is disposed at a longitudinally substantially central portion of a vehicle body in a state in which it is slightly offset to the left of a center line L of the vehicle body, and a power unit P is disposed on a right side of the center line L of the vehicle body. The seat 3 and the power unit P are juxtaposed in a lateral direction of the vehicle body and hence, overlap each other as viewed sideways as shown in FIG. 1.

A steering wheel 5 and a canopy 6 are disposed in front of the seat 3 disposed in an opening 4 in an upper surface of a body B, and a roll bar 7 and a fuel tank 8 are disposed in back of the seat 3. Air intakes 9, 9 open in left and right opposite sides of the body B, so that the power unit P is cooled by ram air introduced through the right air intake 9, while a radiator 10 disposed on a right side of the seat 3 is cooled by ram air introduced through the left air intake 9. An upper surface of the power unit P is covered with the transparent canopy 11 mounted on the body B.

Lateral weight of the vehicle body can be balanced by disposing the radiator 10 on the opposite side from the power unit P with respect to the center line L of the vehicle body, as described above. In addition, the disposition of the fuel tank 8 adjacent a rear portion of the seat 3 insures that the fuel tank 8 can be protected in both a side collision and a frontal collision.

As can be seen from FIGS. 1 to 3 in combination with FIG. 4, the power unit P includes a V-shaped two-cylinder engine E having a crankshaft 21 disposed in the lateral direction of the vehicle body, and a transmission T integrally provided at a rear portion of the engine E. A clutch 22 is mounted at a right end of the crankshaft 21 (i.e., at an outer end in a lateral direction of the vehicle body) and faces an opening 23 which is defined in a right side of the body B, so that the maintenance of the clutch can be easily performed through the opening 23. The power unit P may be a slightly remodeled motorcycle power unit.

The transmission T includes an input shaft 24 and an output shaft 25 which are disposed parallel to the crankshaft 21, and a gear train 26 for selectively establishing a plurality of gear shift stages is interposed between the input and output shafts 24 and 25. An output from the transmission T is transmitted from a left end (i.e., an inner end in the lateral direction of the vehicle body) of the output shaft 25 through a pair of bevel gears 27 to a propeller shaft 28 and then from a rear end of the propeller shaft 28 through a differential 29 to axles 30, 30 of the rear wheels Wr, Wr.

The propeller shaft 28 can be disposed in close proximity to the center line L of the vehicle body by connecting a front end of the propeller shaft 28 to the left end of the output shaft 25. As a result, unless the propeller shaft 28 is largely inclined, the differential 29 can be disposed in close proximity to the center line L of the vehicle body, thereby possibly decreasing the difference between the lengths of the left and right axles 30, 30 of the rear wheels Wr, Wr.

By disposing the propeller shaft 28 substantially parallel to the center line L of the vehicle body, it is possible to prevent the generation of a vibration due to the rotation of the propeller shaft 28 and moreover, to easily insure a speed uniformity of a joint. In addition, by decreasing the difference between the lengths of the left and right axles 30, 30, it is possible to avoid the shortening of the axle lengths to insure sufficient vertical travel of the suspensions 2, 2 which suspend the rear wheels Wr, Wr.

A sequential shift lever 31 is mounted between the seat 3 and the power unit P. The sequential shift lever 31 is swingable only in the longitudinal direction, so that the gear shift stage established in the transmission T is sequentially switched by the operation of the sequential shift lever 31. A driver can conduct a shifting operation only by using the right hand to longitudinally move the sequence shift lever 31. Therefore, the width of a driver's seat can be reduced to a minimum, as compared with a situation where a usual shift lever brought down longitudinally and laterally is employed, and as a result, a space for placement of the power unit P can be enlarged.

As can be seen from FIG. 1, the seat 3 and the power unit P are laterally juxtaposed between axles 32, 32 of the front wheels Wf, Wf and the axles 30, 30 of the rear wheels Wr, Wr. Therefore, a heavy power unit P can be disposed at a central position between the front and rear axles 32, 32 and 30, 30, thereby inhibiting the inertial moment of the vehicle about a yaw axis to enhance the turning performance, and uniformly distributing the load to the front and rear wheels Wf, Wf and Wr, Wr to enhance performance of the vehicle when in motion. Additionally, the distribution of load to the rear wheels Wr, Wr is optimum, as compared with a front engine and front drive vehicle and a front engine and rear drive vehicle, resulting in improved traction performance.

Further, if it is supposed that a lateral slip is generated in rear wheels, Wr, Wr in a conventional mid-engine vehicle including a power unit P mounted in the vicinity of axles 30, 30 of the rear wheels, Wr, Wr, it can be considered that this lateral slip is a yaw motion about a vertical axis passing between left and right front wheels Wf, Wf. In this case, because a driver's seat 3 is located in front of the power unit P, it is difficult for a driver to sense the lateral slip as a variation in lateral acceleration and hence, there is a possibility that a delay in coping with the lateral slip is generated, but also a rotational kinetic energy to be controlled is increased because of a large distance between the power unit P having a large weight and the vertical axis. As a result, control is difficult.

However, if the seat 3 and the power unit P are laterally juxtaposed as in this embodiment, it is possible for the driver to immediately sense the lateral slip of the rear wheels Wr, Wr as the variation in lateral acceleration to quickly cope with the lateral slip, but also the rotational kinetic energy of the power unit about the yaw axis is reduced, resulting in better control.

Yet further, by laterally juxtaposing the seat 3 and the power unit P, a sufficient crushable zone effective upon a collision of the vehicle can be insured in both of the front and rear portions of the vehicle body and moreover, it is possible to displace the seat 3 sideways from a line of an inertial force applied to the power unit P upon a collision of the vehicle. Further, because the seat 3 and the power unit P are in close proximity to each other, noise and vibration of the engine E tend to be transmitted directly to the driver and hence, it is possible to determine the operating conditions of the engine, while actual steering sensations perceived by the driver are enhanced.

Other embodiments of the present invention will now be described with reference to FIGS. 5 and 6.

Figure 5:
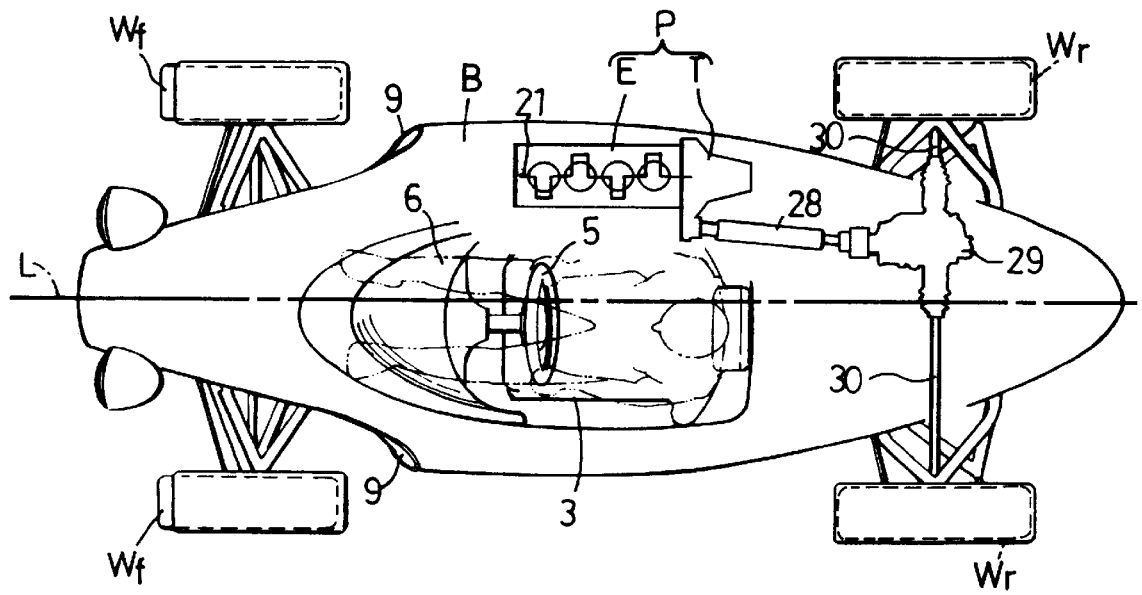
FIG. 5 is a view similar to FIG. 2, but according to a second embodiment of the present invention.

In a second embodiment shown in FIG. 5, a power unit P used in a front engine and front drive vehicle is adapted for use in a mid-engine vehicle re-arranging it through 90°. The mid-engine vehicle of the second embodiment includes an in-line four-cylinder engine E having a crankshaft 21 longitudinally disposed, and a transmission T integrally coupled in the rear of the engine E. A propeller shaft 28 extends rearwards from a lateral inner end of the transmission T.

Figure 6:
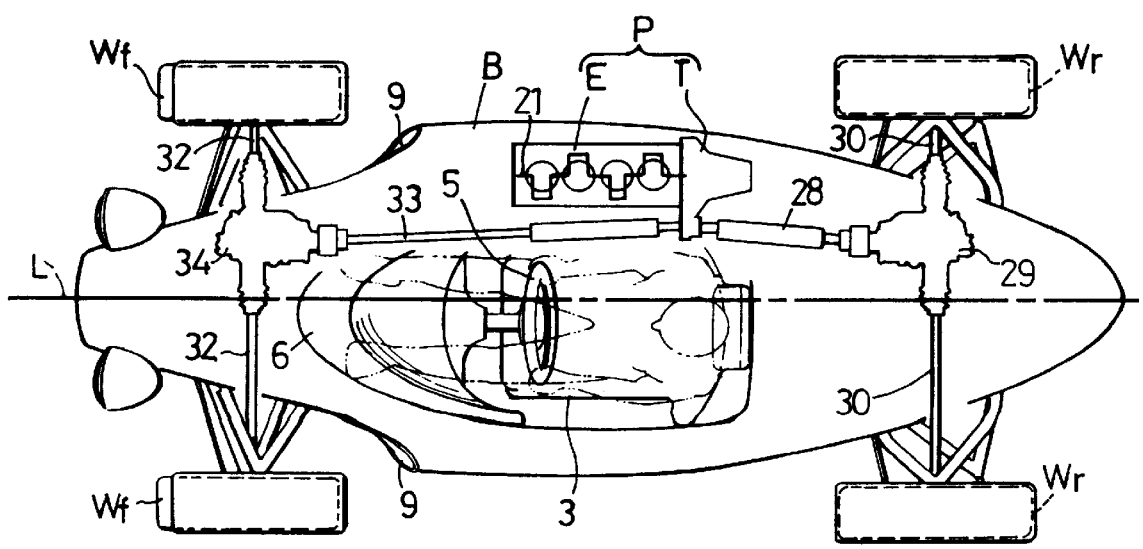
FIG. 6 is a view similar to FIG. 2, but according to a third embodiment of the present invention.

A mid-engine vehicle according to a third embodiment shown in FIG. 6 is a full-time four-wheel drive vehicle constructed by utilizing an intrinsic differential mounted in the transmission T of the power unit P in the second embodiment as a center differential, and connecting the center differential to axles 32, 32 of front wheels Wf, Wf through a propeller shaft 33 and a front differential 34.

Even in the mid-engine vehicles according to the second and third embodiments of the present invention, an effect similar to those in the first embodiment can be exhibited by laterally juxtaposing the seat 3 and the power unit P.

Although the embodiments of the present invention have been described in detail, it will be understood that the present invention is not limited to the above-described embodiments, and various modifications may be made without the subject matter and scope of the invention defined in claims.

We claim:

1. An improved mid-engine vehicle having a driver's seat and an engine disposed between a front axle of left and right front wheels and a rear axle of left and right rear wheels, the improvement comprising:

said driver's seat is laterally disposed on one side of a centerline of a vehicle body and said engine is laterally disposed on the other side of the centerline, said driver's seat and said engine being superposed upon each other when viewed from either side of said vehicle, wherein said vehicle includes a transmission disposed behind said engine in the direction of said rear axle for providing a power transfer path between said engine and at least one of said front axle and said rear axle, and wherein said transmission is operatively connected to at least one of said front axle and said rear axle via propeller shaft means that forms part of said power transfer path, said propeller shaft means being located on the other side of the centerline and operatively coupled with said at least one of said front and rear axles on the other side of the centerline.

2. The improved mid-engine vehicle according to claim 1, wherein said engine consists of a V-shaped two-cylinder engine having a crankshaft with an axis which is laterally disposed.

3. The improved mid-engine vehicle according to claim 2, further including a clutch laterally disposed at an outer end of the crankshaft.

4. The improved mid-engine vehicle according to claim 1, wherein said transmission includes an input shaft and an output shaft which are disposed laterally, and an output is taken from an end of said output shaft nearer said centerline of the vehicle body.

5. The improved mid-engine vehicle according to claim 1, further including a sequential shift lever disposed between said driver's seat and said engine for shifting the transmission by longitudinal movements.

6. The improved mid-engine vehicle according to claim 1, wherein said engine consists of an in-line multi-cylinder engine having a crankshaft whose axis is disposed longitudinally.

7. The improved mid-engine vehicle according to claim 1, wherein said vehicle is a four-wheel drive vehicle and said transmission includes a center differential connected to both said front and rear axles via separate drive shafts.

8. The improved mid-engine vehicle according to claim 1, wherein said engine and said transmission are formed into a single power unit extending in a longitudinal direction of said vehicle .

* * * * *